(No Model.)

A. L. SIEGHÖRTNER, Jr.
CENTRIFUGAL MACHINE.

No. 320,595. Patented June 23, 1885.

WITNESSES
A. Schehl
Ernst Wolff

INVENTOR
August L. Sieghörtner
By his Attorneys
Goepel & Raegener

UNITED STATES PATENT OFFICE.

AUGUST L. SIEGHÖRTNER, JR., OF ST. LOUIS, MISSOURI, ASSIGNOR TO HIMSELF, AND TEILE H. MUELLER, OF NEW YORK, N. Y.

CENTRIFUGAL MACHINE.

SPECIFICATION forming part of Letters Patent No. 320,595, dated June 23, 1885.

Application filed April 30, 1885. (No model.)

*To all whom it may concern:*

Be it known that I, AUGUST L. SIEGHÖRTNER, Jr., of St. Louis, in the county of St. Louis and State of Missouri, have invented certain new and useful Improvements in Centrifugal Filtering-Machines, of which the following is a specification.

The filtering process in centrifugal machines is due to the action of the centrifugal force on the liquor to be filtered and on the filtering material, which latter is made more compact thereby, so that it exerts a more intense filtering action on the liquor, especially when a chemical action is desired.

Centrifugal filtering-machines have been constructed heretofore in which the liquor is forced directly against the filtering-surface, and passed from the center toward the circumference, or by allowing the liquor to pass into a water-tight basket outside of the filtering material, and flow thence from the circumference toward the center, to be then distributed over the rim of the top or bottom flange of the basket. With both methods practical defects are experienced, which interfere with the utility of the machines.

The object of this invention is to furnish an improved centrifugal machine which is more effective in action than the machines referred to, and in which the filtering material can be readily removed and replaced by new material.

The invention consists of a rotating basket having a fixed top flange and a bottom with central depressed portion having openings, a false flange below the top flange, a ring-shaped opening between the false flange and the body of the basket, an interior annular body of filtering material between the false flange and the bottom, and a valve extending over the depressed portion of the bottom, and having an upwardly-bent and perforated rim for the passage of liquor to be filtered, as will appear more fully hereinafter, and finally be pointed out in the claims.

Figure 1:
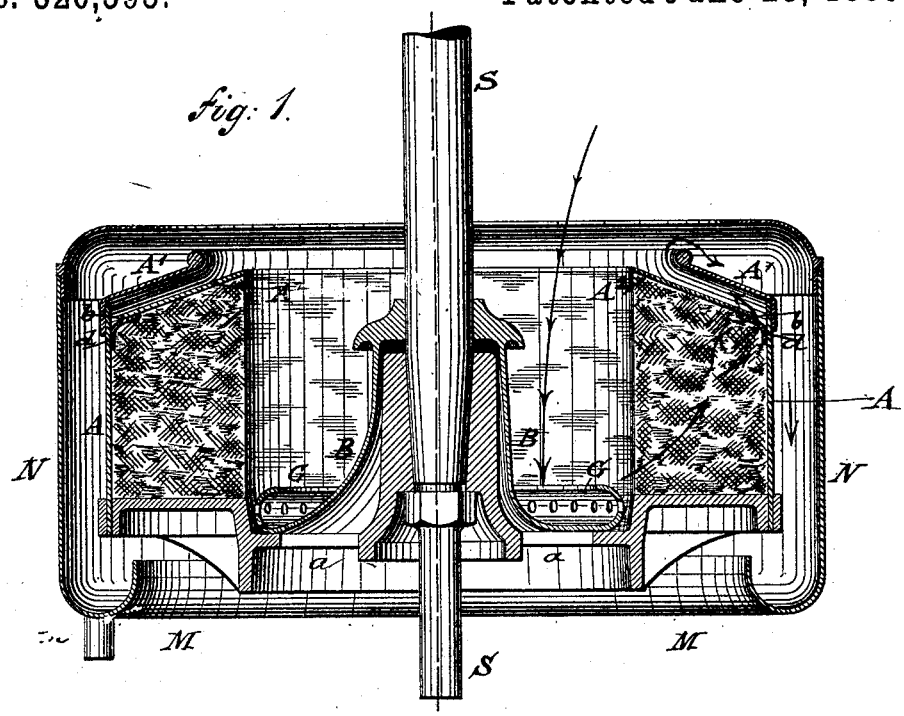
Figure 2:
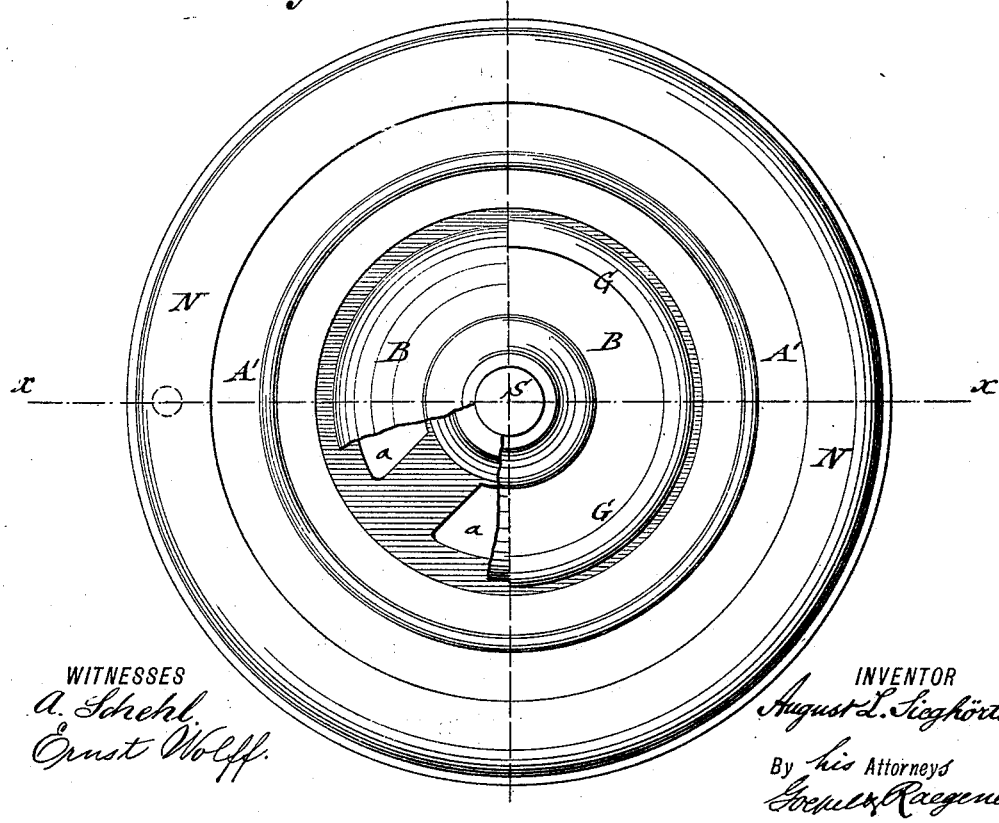

In the accompanying drawings, Figure 1 represents a vertical central section of my improved centrifugal filtering-machine, taken on line *x x*, Fig. 2, and Fig. 2 is a plan of the same with parts broken away.

Similar letters of reference indicate corresponding parts.

In the drawings, A represents the basket of my improved centrifugal filtering-machine, which is secured to a vertical shaft, S, that is rotated by a transmission applied either above or below the basket. The bottom of the basket A is depressed at its central portion and provided with openings *a a* and a valve, B, for discharging the spent filtering material. The basket A is provided with a fixed top flange, A', and with an inner false flange, A², between which and the vertical wall of the basket A a ring-shaped opening, *b*, is formed, through which the liquor escapes after it has passed through the filtering material. The filtering material is arranged between the bottom of the basket and the false flange A², and forms a body of annular shape, as shown in Fig. 1. The ring-shaped opening *b* between the wall of the basket A and the false flange A² is closed by a layer, *d*, of porous packing, such as felt, pieces of woolen fabric, or other suitable material. The depressed portion of the bottom of the basket A, inside of the annular body of filtering material, serves to break the impact of the inflowing liquor, and prevents it from washing up and disturbing the lower part of the filtering material. The liquor to be filtered is conducted as near as possible to the center of the basket on the valve, and is caught by a perforated rim, G, that is either made integral with the valve B or made separate therefrom and placed loosely in position in the depressed portion of the bottom of the basket. The valve B extends over the depressed portion of the bottom and fits tightly thereto, so as to prevent any escape of the liquor.

The inner diameter of the fixed flange A' is larger than that of the false flange A², so that the body of filtering material has a smaller inner radius, and is at a higher level than the level of the liquor in the exterior casing N. This arrangement prevents the liquor from forming irregular waves on the inner surface of the filtering material, so as to interfere with the regular rotating motion of the machine and prevent the liquor from flowing in unfiltered state over the inner edge of the false flange.

When the machine is at work, the liquor on entering the basket is discharged on the lower part of the valve B and passed through the perforated rim G, which acts as a screen to retain the largest impurities. The liquor is then forced in a diagonal direction through the body of filtering material F and the packing b, then along the under side of the flange A', and over the rim of the same into the fixed casing N, which is provided with a bottom trough or gutter, M, having one or more discharge-pipes m.

When it is desired to wash the filtering material in the machine, or wash solid matters in the machine with different liquors, it is preferable to use more openings m, so that the different liquors and water may be collected separately.

Having thus described my invention, I claim as new and desire to secure by Letters Patent—

1. The combination, in a centrifugal machine, of a rotating basket having a fixed flange and an inner false flange arranged at some distance from the body of the basket, and an annular body of filtering material supported between the false flange and the bottom of the basket, substantially as set forth.

2. The combination of a rotating basket having a fixed flange and an interior false flange, the inner diameter of which is smaller than that of the fixed flange, a layer of porous fabric located at the connection of the basket with the false flange, an annular body of filtering material supported between the bottom and the false flange of the basket, and a valve extending over the bottom of the basket, substantially as set forth.

3. The combination of a rotating basket having a fixed flange and an inner false flange, an annular body of filtering material supported between the bottom and the false flange of the basket, a depressed central portion of the bottom having openings, and a bell-shaped valve extending over the openings of the depressed bottom, substantially as set forth.

4. The combination of a rotating basket having a fixed top flange, an inner false flange, and a bottom with a central depressed portion, valve extending over the openings of the depressed portion and having a perforated rim, and a body of filtering material supported between the false flange and the bottom of the basket, substantially as set forth.

5. The combination of a rotating basket having a fixed top flange and a bottom with a depressed central portion, a false flange arranged below the top flange, so as to form a ring-shaped opening between it and the body of the basket, a packing arranged below the annular opening, an annular body of filtering material supported between the false flange and the bottom of the basket, and a valve extending over the depressed portion, and having a bent-up and perforated rim, substantially as set forth.

In testimony that I claim the foregoing as my invention I have signed my name in the presence of two subscribing witnesses.

AUGUST L. SIEGHÖRTNER, Jr.

Witnesses:
PAUL GOEPEL,
SIDNEY MANN.